United States Patent [19]
Neail et al.

[11] 3,919,460
[45] Nov. 11, 1975

[54] MOISTURE PROOF CABLE SPLICE EMPLOYING HYDROPHOBIC POWDER

[75] Inventors: William R. Neail, Santa Susana; Clifford A. Rahm, Sylmar, both of Calif.

[73] Assignee: Perkins Research & Mfg. Co., Canoga Park, Calif.

[22] Filed: Aug. 20, 1973

[21] Appl. No.: 389,560

[52] U.S. Cl. ................ 174/87; 174/76.92; 264/272
[51] Int. Cl.² ........................................ H02G 15/08
[58] Field of Search ...... 174/76, 77 R, 74 A, 91–93, 174/138 F, 10, 38; 264/272; 156/49

[56] References Cited
UNITED STATES PATENTS
3,419,669  12/1968  Dienes ............................ 174/93 X
3,836,694  9/1974  Kapell .............................. 174/92 X

OTHER PUBLICATIONS
"Wet Splices are Dead!", Telephone Engineer & Mangagement, 4–15–73, p. 31.
TPI Installation Practice, Product No. 203–01, 203–02, 4pp. printed 3–73 by Telephony Progress Incorporated, Burbank, Ca. 91504.
Piccione, "Direct-Buried Splice Fights Corrosion, Yields Savings," Electrical World, June 30, 1969; pp. 28, 29.

Primary Examiner—Darrell L. Clay
Attorney, Agent, or Firm—Blakely, Sokoloff, Taylor & Zafman

[57] ABSTRACT

A cable splice assembly that will protect a temporary or permanent splice from contamination, particularly water is disclosed. A hydrophobic powder which forms a contamination barrier is disposed around the cables and the splice and then compressed. An enclosing means holds the powder about the splice and is compressed by tightly wrapping the enclosing means or by similar means.

9 Claims, 24 Drawing Figures

HYDROPHOBIC CHALK POWDER

MOISTURE PROOF CABLE SPLICE EMPLOYING HYDROPHOBIC POWDER

BACKGROUND OF THE INVENTION

1. Field of the Invention

The invention relates to cable splices which require protection from contamination.

2. Prior Art

The present invention is employed to protect splices and access points in heavy duty electrical cables and particularly in cables used in tele-communications. However, while the present invention is particularly suitable for tele-communication cables, its use is not so restricted.

The most common type of splice is an in-line splice which occurs when two or more cables are to be coupled together. The next most common type of splice is the butt splice which is a splice where all the spliced conductors are at one end of a cable or cables. The failure in prior art splice assemblies such as the in-line and butt splices assemblies arises because of the inability of these assemblies to cope with the problem of preventing contamination, such as moisture, from reaching the conductors within the splice. Even splices installed by highly trained personnel when exposed to the elements become contaminated and may require periodic inspection and replacement. As will be seen, the present invention provides a splice assembly which has numerous advantages over the prior art and which can be installed without highly skilled personnel, as required with many prior art splice assemblies. In addition, the present invention allows a highly efficient method for protecting splices against moisture.

An example of prior art which utilizes hydrophalic powder is disclosed in an article written by Nicholas E. Piccione which was published by *Electrical World* on June 30, 1969 "Direct-Buried Splice Fights Corrosion, Yields Savings", (Pages 28–29). This article discloses a method for protecting splices by using hydrophobic powder comprised of calcium carbonate which is specially treated to repel moisture. The housing for the splice assembly is made by excavating a pit in the ground and by placing a polyethlylene bag within the excavation. Powder is then placed into the bag and the splice is disposed within the powder. The assembly is completed by backfilling the excavation and tamping the backfill.

The problems involved with the above described prior art technique are that a large volume of powder is required and that a special silicone grease is required around the splice area. The powder adheres and hardens on the silicone grease which protects the splice.

The present invention eliminates the need to use a large volume of powder, by compressing the powder to make use of surface tension. The present invention also eliminates the need for the silicone grease which enables clean easy re-entry.

SUMMARY OF THE INVENTION

The cable splice assembly of the present invention includes a protective powder disposed about conductors in a splice, an enclosing means or cover for enclosing the protective powder about the splice area, and a compressing means for compressing the enclosing means and power in position on the cables and splice area. The cable splice once in position protects the conductors from corrosion and contamination, thereby eliminating maintenance.

The protective powder is generally disposed about the conductors and the cable and insulates as well as protects from contamination. When the powder is so placed it forms a protective barrier only if it is compressed. When compressed the surface tension forces become greater than any capillary forces which may develop within the powder. The compression is supplied by the compressing means which in some embodiment is tape. However, additional compression may result from external forces, such as fluid pressure when the splice assembly is submerged in water.

One very important use of this splice assembly occurs when cables are to be spliced and then subjected to direct water contact, such as underwater cables while lying on the ocean floor. When cables are placed on the bottom of a lake or ocean they are subjected to tremendous pressures, the greater these forces the greater the surface tension in the powder, and the better the contamination barrier. Prior art splice assemblies cannot resist severe pressures and become contaminated when subjected to water. This feature makes the present invention particularly suitable for use when a splice assembly will be subjected to water or water pressure.

The present invention employs four embodiments to solve the problems encountered in different splicing applications. In the first embodiment a powder bag is used when a splice assembly is to be temporary. The powder bag assembly is rapidly installed and protects conductors and cables from contamination.

The second embodiment, a butt type assembly, is used in direct burial, manhole or spliced box applications and provides a re-enterable closure.

The third embodiment and perhaps the most common is the standard in-line splice assembly. This splice assembly is primarily designed for permanent splice connections, however, it is re-enterable. It may be used for splicing any non-pressurized cable and fully protects the spliced area from contamination.

The fourth embodiment, a butt type assembly is used in the same circumstances as the second embodiment. However, its composition more resembles the third embodiment.

All four of the basic embodiments of the present invention provide a unique safe and easily installable assembly which will protect splices in cables or conductors from contamiation. Indeed the splice assembly protects the splice from the most critical contaminate, moisture. In prior art techniques protection from moisture was almost impossible.

DETAILED DESCRIPTION OF THE INVENTION

Figure 1:
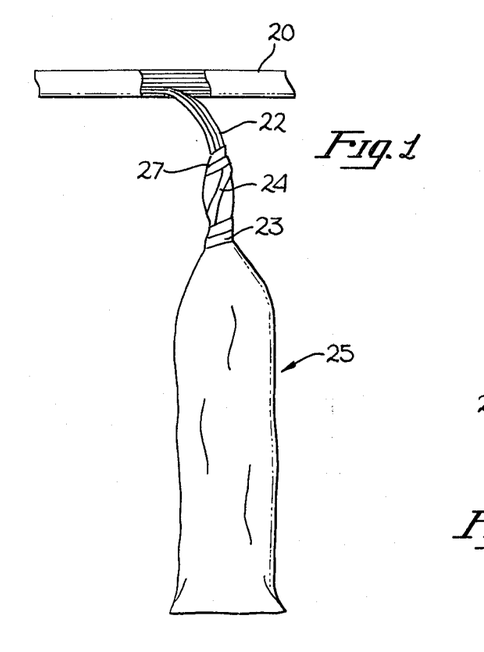
FIG. 1 shows in perspective, the first embodiment which is a powder bag splice assembly.
Figure 2:
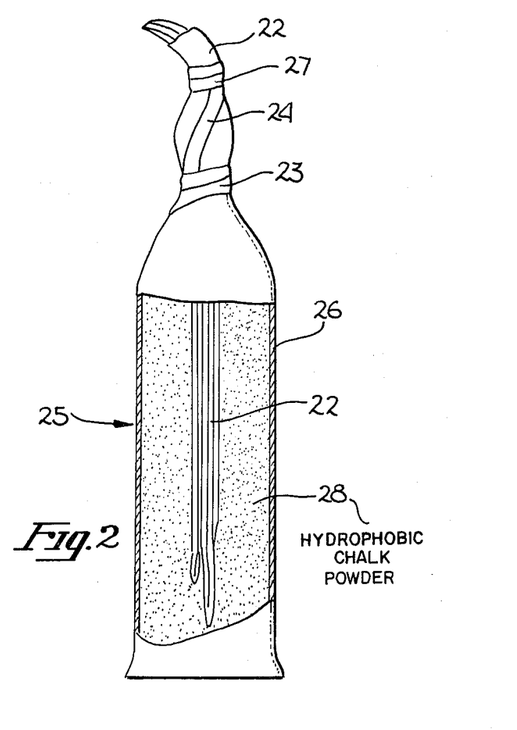
FIG. 2 is a blow-up partially cut away perspective view of the first embodiment.

The first embodiment of the present invention is shown diagrammatically, in FIG. 1 and 2, to illustrate a typical application of the present invention. The splice assembly shown in FIG. 1 is hereinafter referred to as the powder bag splice assembly 25. The powder bag splice assembly 25 is disposed about conductors which have been electrically connected to protect them from contamination.

FIG. 2 shows the splice assembly 25, partially cut away to expose the assembly. The powder bag splice assembly 25 is comprised of an enclosing means 26, protective powder 28, and a compressing means 23, 27 and 24.

Typically, a clear polyvinyl chloride plastic bag is used for enclosing means 26 to contain the powder 28. The powder 28 prevents contamination from reaching the individual conductors 22. This powder 28 is a fine amorphous chalk powder (a natural inorganic material compound of the calcareous remains of minute marine organisms) modified through processing procedures to make it hydrophobic. The powder is commercially available through Protexulate Division of Pluess-Staufer Inc. of New York. The particle size distribution is selected and controlled such that the surface tension of the processed powder is far greater than capillary forces which may develop within the powder.

In a typical application of a powder bag splice assembly 25 a cable 20 will contain several conductors 22, which require splicing. Initially the conductors 22 are coupled using available methods, well known in the art. After the conductors have been coupled they are placed within the polyvinyl chloride bag (enclosing means 26), with is filled with the protective powder 28. The conductors are inserted to within one-half to three-fourths of an inch from the end of the enclosing means 26. Next the powder is carefully molded by hand such that the powder is disbursed evenly, surrounding each of the conductors 22.

The enclosing means 26 or bag containing the conductors 22, and the powder 28 is then secured in place to the conductor 22 and the cable 20, by a tape collar which comprises the compressing means 27. This tape collar also serves to help compress the powder 28. Compression is accomplished by placing a second tape collar compressing means 23 approximately two inches below the first tape collar, and then by placing a spiral loop (compressing means 24) connecting the first tape collar and the second tape collar. The powder bag splice assembly 25 after being compressed will serve as a protection to the conductors and will prevent contamination.

Re-entry of the splice assembly 25 is easily accomplished. First the tape comprising the compressing means 23, 27 and 24 is removed. The conductors are then withdrawn. A small wooden dowel or hammer is used to loosen the powder from the individual conductors. Any powder remaining on the conductors can then be brushed away. It is possible to re-work the conductors 22 and then re-insert them into the bag, thereby re-using the splice assembly 25.

Figures 5, 6, 7, 8, 9:
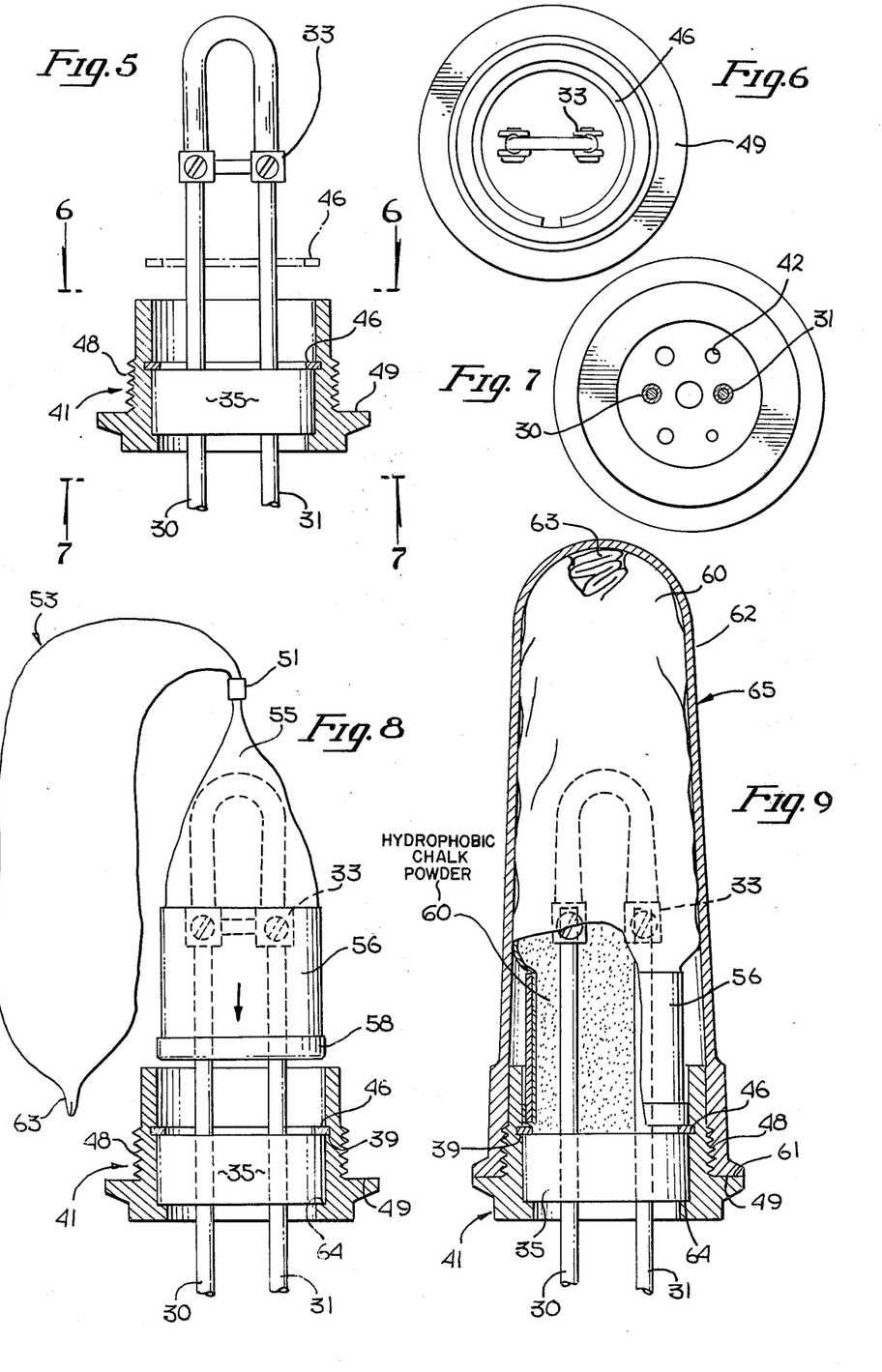
FIG. 5 is a cross section view which shows the sealing grommet locked in place within the end supporting means of the butt assembly of the second embodiment.
FIG. 6 is a cross-sectional view taken through section line 6–6 of FIG. 5 and shows the top view of the end supporting means of the butt splice assembly.
FIG. 7 is a cross-sectional view of the base assembly of the butt splice assembly taken through section line 7–7 of FIG. 5.
FIG. 8 is a cross-sectional view which shows the butt splice assembly and the enclosing means just prior to disposing the powder about the splice.
FIG. 9 is a cross-sectional view of the butt splice assembly, the second embodiment, after the outside cover hood or compressing means is secured.

Referring now to FIG. 9, a sectional view of the installed second embodiment is shown. The splice assembly 65 is shown in place, in a typical butt splice application. The basic components of this assembly are: a protective powder 60, enclosing means 53, spacer 33, end supporting means 41, sealing grommet 35, locking ring 46 and a compressing means or hood 62.

Figure 3:
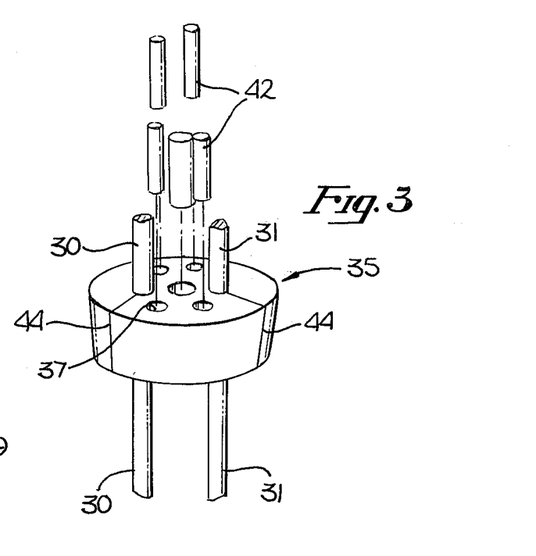
FIG. 3 is a perspective view of a sealing grommet, sealing plugs and cables, prior to placement within the second embodiment.
Figure 4:
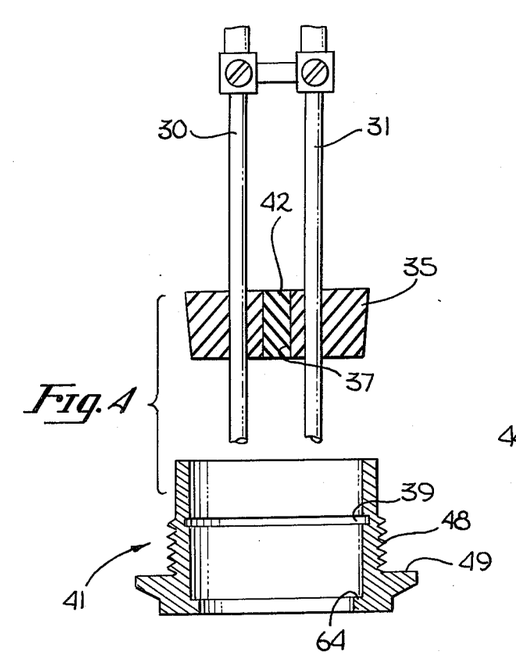
FIG. 4 is a cross-sectional view of the sealing grommet and cables just prior to being placed within the end supporting means of the butt splice assembly of the second embodiment.

In the second embodiment a sealing grommet 35, fabricated from neoprene rubber, is used to secure the cables 30 and 31 in position. The sealing grommet 35, as best shown in FIGS. 3 and 4, is cylindrical in shape being approximately one inch thick. Note, however, that one face of the sealing grommet 35 is slightly larger in diameter than the opposite face. This configuration allows the sealing grommet 35 to be disposed into the end supporting means 41 creating an effective seal.

The sealing grommet 35 is perforated with a plurality of apertures 37 through its thickness. Each aperture 37 is different in diameter. These apertures 37 provide a passageway into the butt splice assembly 65 for cables which are to be coupled. The cables 30 and 31 are placed into the sealing grommet 35 by means of pre-cut slits 44. Each aperture 37 which does not contain a cable is plugged with special premade sealing plugs 42. When each aperture 37 is plugged the sealing grommet 35 is completed.

The sealing grommet 35 fits within the end supporting means 41 which is fabricated of a heavy durable plastic. The end supporting means 41 is cylindrical in shape, having a threaded outer portion 48, a base flange 49, and end flange 64, and a locking ring slot 39. (See FIG. 5). The base flange 49 acts as a sealing device when the hood 62 is screwed on the supporting means 41. The sealing grommet 35 is held within the supporting means 41 by means of end flange 64 and a locking ring 46. The locking ring 46 is compressed and positioned in the locking ring slot 39 after the sealing grommet 35 is positioned.

The compressing means cover hood 62 which is screwed onto the base housing 41, is normally fabricated from a transparent heavy gauge plastic. Note that the hood 62 must define a volume slightly smaller than the volume of the supporting means 41 and the powder 60 which is to be placed inside of the hood 62. The difference in volume is critical because the powder 60 cannot properly prevent contamination from moisture unless it is compressed. The compression results because the enclosed volume of the cover hood 62 is slightly smaller than the volume of the powder 60. The compression occurs as the hood 62 is screwed onto the end supporting means 41.

The powder bag which comprises enclosing means 53 is important in the second embodiment and is best shown in FIG. 8. The enclosing means 53 is divided into two sections by clip 51. The first section contains the powder and is closest to end 63. The second section has the bag sleeve 56 fastened to it and is able to be positioned over the splice area while the sleeve base 58 is fitted into the supporting means 41. The powder is then transferred into section 55 of the enclosing means by removing the clip and hand molding the powder into position. The end 63 is then rolled up and positioned on top of the powder 60. (See FIG. 9).

Having now described the physical components of the third embodiment, a typical installation procedure will be described in detail.

Referring particularly to FIG. 3, the sealing grommet 35 is shown disposed about two cables 30 and 31 which contain a plurality of coupled conductors. Each cable 30 or 31, has been positioned into a pre-formed aperture 37 of equal diameter to each cable. The cables 30 and 31 are inserted into the pre-formed apertures 37 by spreading apart the sealing grommet 35, along the slits 44, and then by placing the cable into the aperture 37. It is critical that each cable be inserted into a pre-formed aperture 37 having a diameter equal to that of the cable.

After the cables have been positioned within the sealing grommet 35, a plurality of open apertures 37 will remain. These open apertures 37 must be permanently sealed if the sealing grommet 35 is to properly perform its function. This sealing is accomplished by placing plugs 42 into the open apertures 37. This process is best shown in FIG. 3, prior to insertion, and in FIG. 4, after the plugs have been placed. After the cables 30 and 31 have been secured within the sealing grommet 35 and the apertures 37 have been sealed, a mechanical spreader 33, shown in FIG. 4, which spaces the cables one from the other is installed.

The gromment 35 is positioned within the end supporting means 41 such that smaller diameter face contacts the end flange 64, while the opposite face is adjacent the locking ring slot 39. The locking ring 46 when inserted within the locking ring slot 39 prevents movement of the sealing grommet 35. This assembly step is best displayed in FIG. 5 which shows the locking ring 46 positioned before and after placement. FIG. 6 and 7 show sectional views of the sealing gromment 35 in relation to the supporting means 41 after the sealing grommet has been positioned.

Now referring to FIG. 8 a pictorial view of the technique employed for disposing the protective powder 60 within the splice assembly 65, is shown. First the open end 55 of the bag or enclosing means 53 is positioned over the conductors 22 and spacers 33 such that the bag sleeve 56 encloses the conductors 22 while the base end 58 of the bag sleeve 56 contacts the sealing grommet 35. Next the retaining clip 51 is removed from the bag such that the powder 60 can be disposed about the conductors and cables. The powder 60 is then molded by hand so that each of the cables and conductors is completely encased by the powder 60.

Compaction of the powder 60 is accomplished by placing the cover hood 62 over the enclosing means 53 such that the hood 62 can be screwed onto the threads 48 of the end supporting means 41. The compression increases until the bottom flanges 61 of the outside cover hood 62 are adjacent to the bottom flanges 49 of the end supporting means 41, as best shown in FIG. 9. It is important to note that the volume of powder must be slightly larger than the volume defined within the outside cover hood 62 in order for compression of the powder 60 to be accomplished.

The completed butt splice assembly 65 is shown in section in FIG. 9. It is re-enterable by unscrewing the outside cover hood 62, by removing the enclosing means 53 and by dusting the powder 60 from the cables and conductors. Additional cables could be joined or coupled to the existing cables and splice assembly 65 could then be reused and returned to service.

Figures 15, 16, 17:
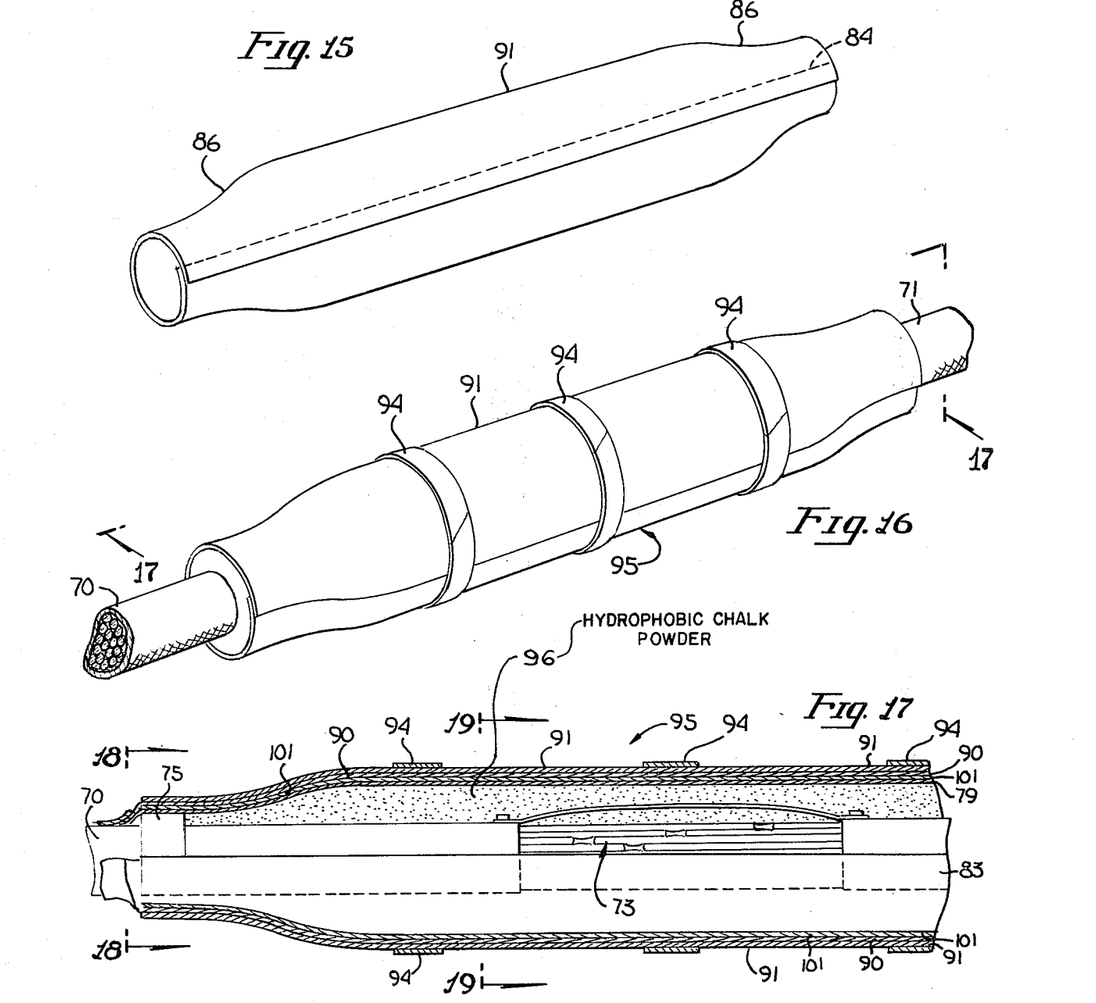
FIG. 15 is a perspective view of the protective jacket of the third embodiment.
FIG. 16 is a perspective view of the third embodiment, the completed in-line splice assembly.
FIG. 17 is a cross-sectional view taken through section line 17—17 of FIG. 16 showing the completed splice assembly.

The third embodiment is shown in FIG. 17 as a sectional view of a completed in-line splice assembly. The in-line splice assembly 95 has twelve basic components: an outer enclosing jacket 91, a protective powder 96, compressing means (tape 90,) holding tape 101, spacing foam 77 and 87, an enclosing means 79, two end supporting means 75, a supporting shell 83, enclosing means seals 89 and 81 and jacket bands 94.

The outer protective jacket 91 is best shown in FIGS. 15 and 16, and is made of a flexible plastic. The protective jacket 91 is basically cylindrical in shape, however, the jacket 91 narrows such that each end 86 is smaller in diameter than the major portion of the protective jacket 91. The outer protective jacket 91 includes a slit 84 extending from one end to the other. This slit 84 allows the protective jacket 91 to be spread apart so that it can be placed about the cables and splice area. In installation one end of the slit 84 overlaps the opposing edge. This overlap provides a method for adjusting the outer diameter of the protective cover 91 to the exact diameter of the partially assembled splice assembly.

Figures 10, 11, 12, 13, 14:
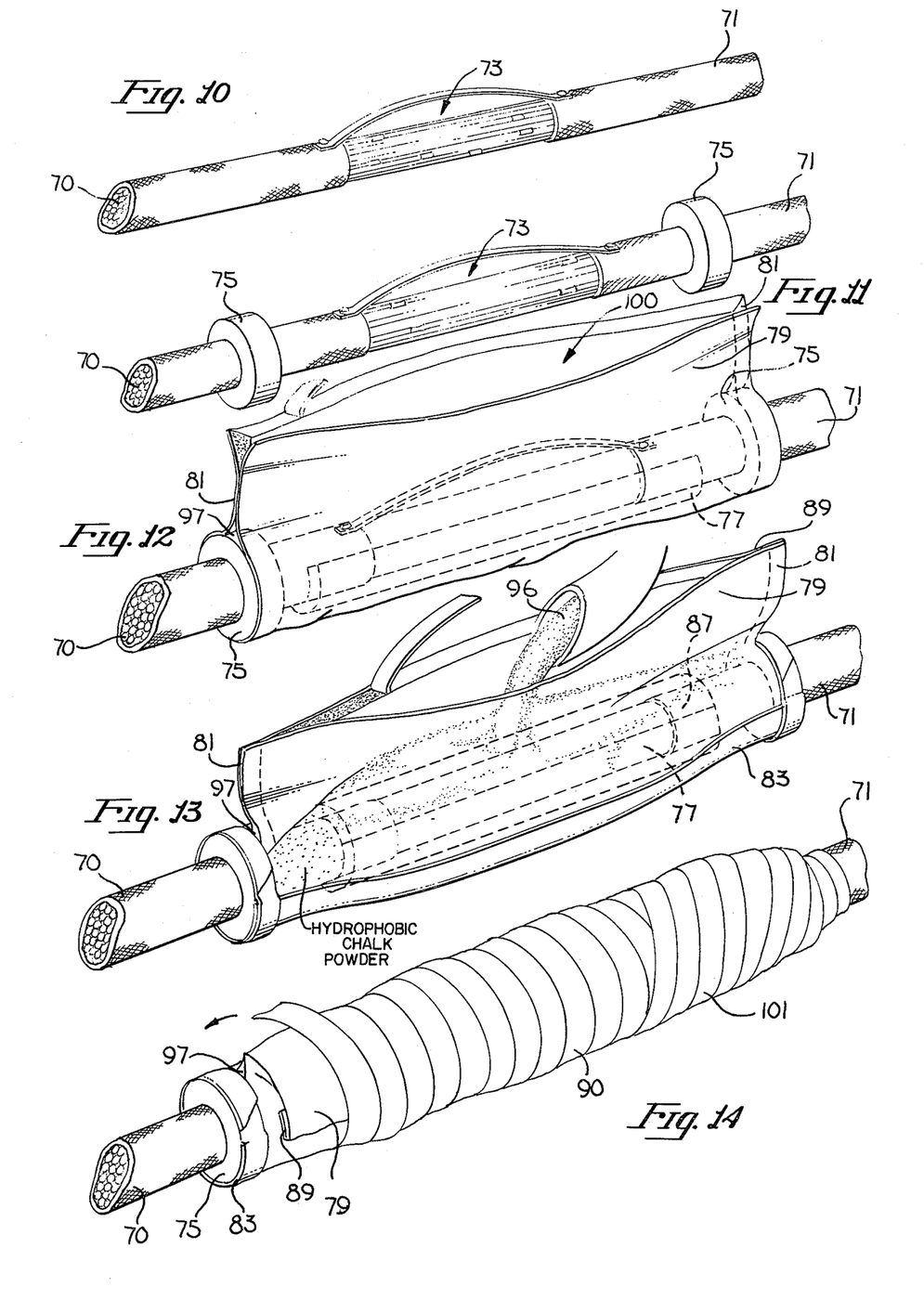
FIG. 10 is a prespective view of the third embodiment, showing two cables and spliced conductors prior to placement of the in-line splice assembly.
FIG. 11 is a perspective view of the cables and splice area and supports in the third embodiment.
FIG. 12 is a perspective view of the cables with the base supports and enclosing means in the third embodiment.
FIG. 13 is a perspective view of the cables with the supporting shell positioned around the enclosing means showing powder being disposed in the third embodiment.
FIG. 14 is a perspective view of the splice assembly area and compressing means or tape in the third embodiment.

The inline splice assembly 95 utilizes a special porous foam 77 and 87 used as a spacer. The pores in the spacers 77 and 87 allow the powder 96 to permeate the spacer, thereby providing a protective layer of powder 96 about the spliced conductors 73. In addition to providing a protective covering the spacers 77 and 87 serve to position the conductors 73 approximately on the axis of the splice assembly 95. The spacers are formed from two separate pieces 87 and 77 as best shown in FIGS. 12 and 13. When in place they form a cylinder disposed about the conductors and cables.

A plastic sheet or enclosing means 79 is disposed about the spacers 77 and 87 and cables 70 and 71 such that the protective powder 96 can be placed about the splice area and be retained. The enclosing means 79 is preferably a clear flexible plastic sheet of rectangular shape. The sheet is placed under the cables, folded and then taped together with enclosing means seals 81 along the open sides nearest the end supporting means 75, thereby forming an enclosure having an open end 100. Powder 96 can then be placed within the defined volume of the enclosing means 79. This step in the assembly process is best shown in FIGS. 12 and 13.

The splice assembly 95 has two end supporting means 75 which are formed from a heavy two sided sealing tape. These end supporting means 75 are fabricated by wrapping tape about the cable, thereby forming a cylindrical shaped end support disposed about each of the cables 70 and 71, and is best illustrated in FIG. 11.

A half shell, supporting shell 83, made of a ridged polyethylene plastic is used to form the basic shape of the splice assembly 95. The half shell 83 takes the same configuration as the protective jacket 91, except that it is only one half of the jacket 91. During assembly this supporting shell 83 is used to support the enclosing means 79, powder 96 and spacing foam 77 and 87 and is secured between the two end supporting means 75. This half shell 83 is best shown in FIG. 13.

A compressing means or tape made of a non-adhesive binder 90 is used to compress the powder 96. This non-adhesive binder 90 is wrapped around the enclosing means 79 and the half shell 83 until none of the half shell 83 or the enclosing means 79 is exposed. Holding tape 101 is disposed about the compressing means or tape 90 either at selected points or over the entire splice assembly. The holding tape 101 secures the tape 90 in place and also may serve as an insulating layer. The compression means or tape 90 and holding tape 101 is best shown in place between the cables 70 and 71 in FIG. 14.

Having now described the basic physical make-up of the in-line splice assembly 95, a typical installation procedure will now be described in detail.

Referring first to FIG. 10, two cables 70 and 71 having individual conductors 73 spliced together are shown. The individual conductors may be spliced by any of the splicing techniques well known to those skilled in the art.

Once the cables 70 and 71 have been spliced, the two end supporting means 75 are installed. The end supporting means 75 are placed respectively around cables 70 and 71 approximately 10 inches from the splice area 73. The end supports are fabricated from a two-sided sealing tape, and built-up by tape wrappings. After the supporting means 75 are formed as best shown in FIG. 11, the enclosing means 79 is installed.

The enclosing means 79 which has a spacing foam 77 preplaced is then prepared for assembly. The enclosing means 79 is positioned and taped to the end supporting means 75. Each side of the enclosing means 79 is then taped (seal 81) closed leaving only the opening 100. The support shell 83 is then positioned and secured to the end supporting means 75. The shell 83 serves as the lower foundation for the splice assembly 95 and is best shown in place in FIG. 13.

Protective powder 96, as best shown in FIG. 13 is then disposed within the volume defined by the enclosing means 79. Foam 87 comprising a spacer, is then positioned over the splice area and the remainder of the powder 96 is disposed on the foam 77 and 87. It is important that the inplace powder 96 be molded by hand such that it is absorbed into the porous foam 77 and 87 and distributed evenly around the splice area 73 and cables 70 and 71. This is accomplished by hand manipulation inside the enclosing means 79 after the powder has been placed. The opening 100 of the enclosing means 79 is then sealed by tape (seal 89). Note, however, two air holes 97 which allow the entrapped air to escape as the enclosing means 79 is compressed must not be sealed. These holes 97 are formed when the sides of the enclosing means 79 are sealed by leaving a small untaped portion.

The surplusage of the enclosing means 79 as shown in FIG. 13 is rolled up until it is snug against the protective powder 96. The sealed sides of enclosing means 79, after being rolled up, extend so as to project over the end supporting means 75. These sides are then secured to the end supporting means. It is important that the air holes 97 are not taped shut during this operation since the powder 96 cannot then be compressed. The non-adhesive plastic compressing means tape 90 is then used to compress the powder 96. This is accomplished by wrapping the non-adhesive tape 90 tightly continuously around the support shell 83 and enclosing means 79 from the center of the splice to one end supporting means 75 and then back to the other end supporting means and then back to the center. The non-adhesive tape 90 is then secured into place by holding tape 101. FIG. 14 shows how the splice assembly appears after this step of the preparation has been completed.

The outer protective jacket 91 is then positioned such that each end of the jacket 91 is positioned over the end supporting means 75. Plastic jacket bands 94 are then used to fasten the jacket 91 in place.

Figure 18:
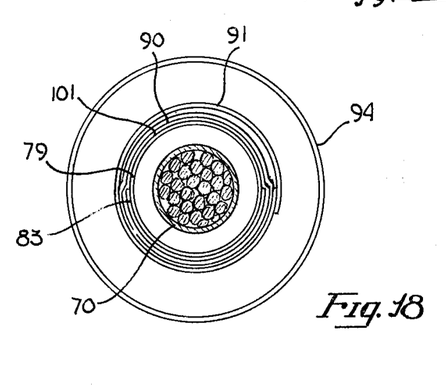
FIG. 18 is a cross-sectional view taken through section line 18—18 of FIG. 17 showing an end view of the cable and splice assembly.
Figure 19:
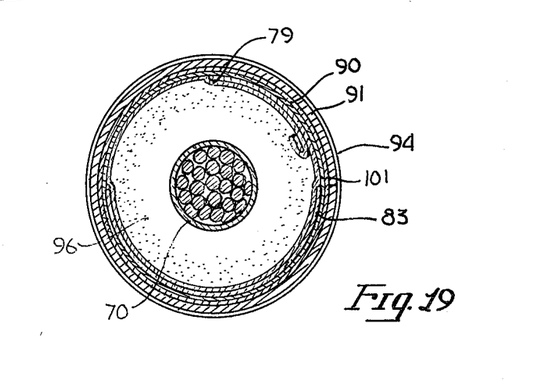
FIG. 19 is a cross sectional view taken through section line 19—19 of FIG. 17 showing the completed splice assembly.

The completed splice assembly is shown in FIG. 16. Additional illustrations regarding construction of the splice assembly 95 can best be seen in FIGS. 17, 18 and 19, wherein cross sections of the completed splice assembly 95 are shown.

Figures 20, 21, 22, 23, 24, 25:
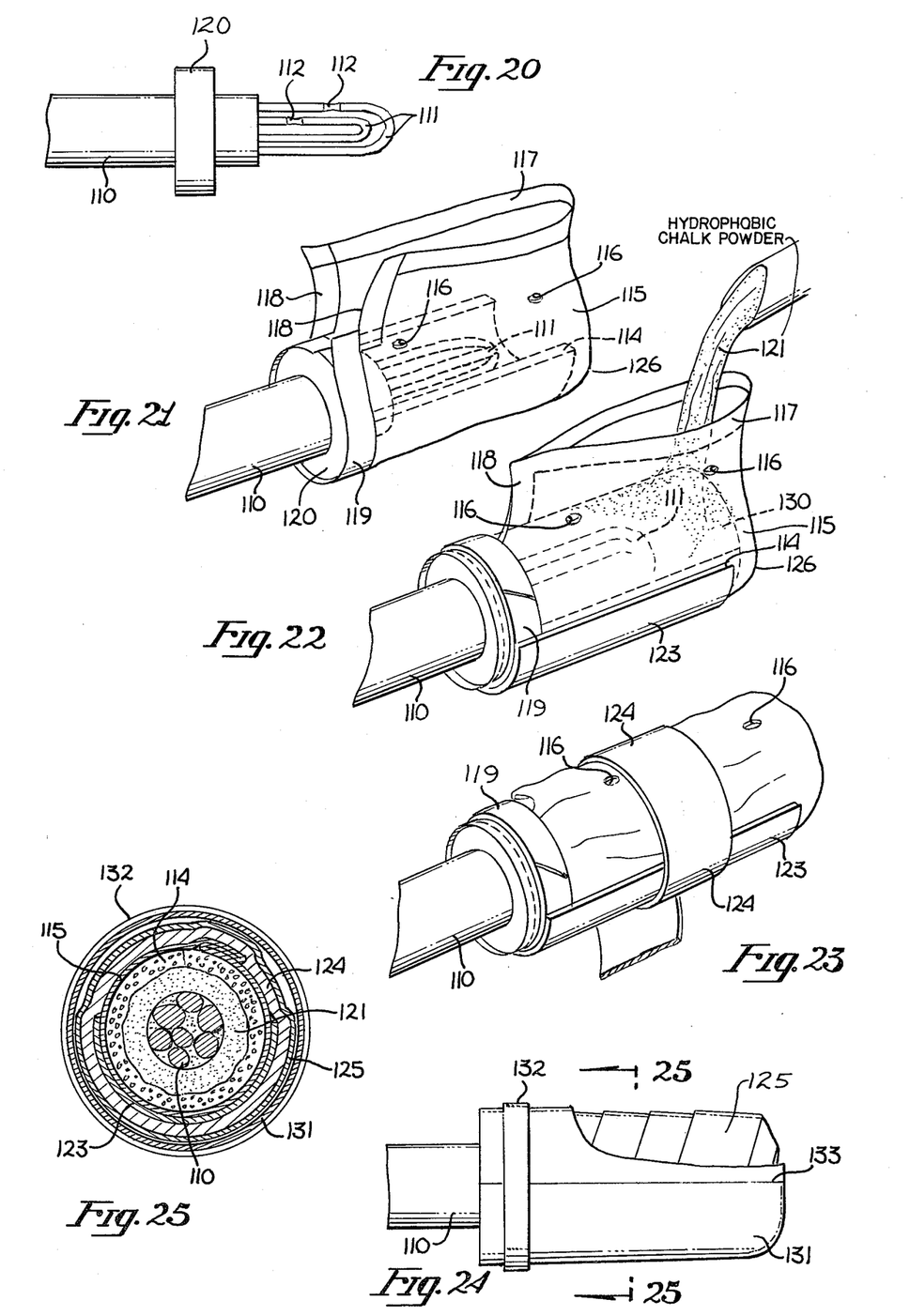
FIG. 20 is a side view of the fourth embodiment showing the cable, spliced conductors, and end supporting means
FIG. 21 is a perspective view of the fourth embodiment with the enclosing means positioned on the cable.
FIG. 22 is a perspective view of the fourth embodiment with the enclosing means and supporting shell in position.
FIG. 23 is a perspective view of the fourth embodiment showing the compressing means being applied.
FIG. 24 is a side view of the completed fourth embodiment.
FIG. 25 is a cross-sectional view taken through section line 25—25 of FIG. 24 showing the interior of the fourth embodiment.

Now referring to FIG. 24, the completed fourth embodiment is shown. This embodiment is used in butt splice applications, however, its physical make-up is similar to the in-line splice assembly. It is comprised of an enclosing means 115, protective powder 121, end supporting means 113, supporting shell 123, foam spacers 114 and 130, compressing means (tape 124,) holding tape 125, and enclosing means seals 117, 118, and 119.

The enclosing means is preferably a clear flexible plastic sheet, generally rectangular in shape with two sides open and two sides sealed as best shown in FIG.

21. This shape enables the splice assembly to be placed in the enclosing means 115 through one of the unsealed sides, while the protective powder 121 may be disposed from the other open side. The container has three enclosing means seals 117, 118 and 119. These tape seals secure the container to the splice assembly. Seal 119 fastens the enclosing means 115 to the end supporting means 120. Seal 118 seals the remainder of side closest the end supporting means 120, (see FIG. 22), thereby forming an enclosing bag with one opening. The last seal 117 seals the remaining open end to enclose the enclosing means 115. The enclosing means 115 defines a plurality of apertures 116 disposed through it which enables air to escape when the assembly is compressed.

The protective powder used in this embodiment is similar to that employed in the prior embodiments. The end supporting means 120 is formed from a heavy two sided sealing tape similar to the end supports in the third embodiment. The supporting shell 123 is also similar to the shell 83 employed in the third embodiment, as is the holding tape 125, compressing means (tape 124) and foam 114 and 130 used as spacers.

The outer protective jacket 131 is best shown in FIG. 24. The jacket 131 is made of the same material as the protective jacket 91 of the third embodiment and serves the same function. The outer jacket 131 differs in that it only has one open end, a slit which extends along one end and an enclosed end. A jacket band 132 is used to secure the outer jacket 131 in place and is similar to those employed in the third embodiment. (see FIG. 24)

Having now described the physical make-up of the fourth embodiment a typical installation procedure will now be described. Referring first to FIG. 20 a cable 110 having individual conductors 111 are shown with splices 112. The splices 112 are of the type well known to those skilled in the art.

After the conductors 111 are spliced the end supporting means 120 is installed. The end supporting means 120 is placed around cable 110 approximately 2 inches from the ends of the cable 110. This support is fabricated from a two sided tape, and built-up by tape wrappings. After the end supporting means 120 is formed the enclosing means 115 is installed.

The enclosing means 115, which has spacing foam 114 pre-placed is disposed around the splice as shown in FIG. 21. The spacing foam 114 contacts the end 126 of the enclosing means 115; tape seal 118 is fastened so that only one end of the enclosing means 115 remains open. The supporting shell 123 is then disposed under the enclosing means 115 as shown in FIG. 22 and the end is taped to the end supporting means 120. The protective powder is then poured into the enclosing means 115 and disposed about the conductors 112 and foam 114. The powder 121 is then hand worked to enable complete coverage of the conductors. The remaining porous spacing foam 130 is then disposed over the conductors and powders to form the circular spacer. More powder 121 is then poured into the enclosing means 115 until the entire spacing foam 130 is covered.

Tape seal 117 is then fastened which completes the means 115. The loose end of the enclosing means 115 starting at seal 117 is rolled toward the splice until it is snug against the powder 121 and foam 130, as shown in FIG. 23. The non-adhesive compressing means tape 124 is then applied to the assembly. The compressing means tape 124 is applied tightly around the assembly so that the powder 121 is compressed against the supporting shell 123. The apertures 116 allow entrapped air to escape from the enclosing means 115 which allows the powder 121 to be compressed.

The holding tape 125 is then applied over the compressing means tape 124 as shown in FIG. 24. This holding tape secures the compressing tape into position. The outer protective jacket 131 is then disposed around the splice by spreading it apart along slit 133. The jacket 131 is then closed such that one end of the slit 133 overlaps the other end of the slit 133 forming an adjustable closure. The jacket band 132 is then fastened around the protective jacket 131 completing the splice assembly. FIG. 25 shows in cross section the completed splice assembly of the fourth embodiment.

We claim:

1. A cable splice assembly insulating and protecting a conductor within a cable from moisture or other contaminants comprising:
   a. enclosing means supported by said cable and surrounding said conductor, said enclosing means defining a volume including said conductor;
   b. hydrophobic powder disposed within said volume defined by said enclosing means and surrounding said conductor; and
   c. compressing means disposed about said enclosing means and supported by said enclosing means for compressing said powder disposed within said enclosing means whereby moisture or other contaminants are prevented from contacting said conductor.

2. The cable splice assembly of claim 1 wherein said compressing means comprises an elongated elastic binding material wrapped about said enclosing means.

3. The cable splice assembly of claim 1 wherein said hydrophobic powder is an amorphous natural inorganic material processed such that it is hydrophobic.

4. The cable splice assembly of claim 3 wherein said enclosing means comprises a sheet of flexible material positioned beneath said cable and folded upwardly with opposite side edges of said material secured together to define said volume.

5. The cable splice assembly of claim 4 including substantially rigid supporting means secured to said cable and positioned beneath said enclosing means supporting said enclosing means.

6. The cable splice assembly of claim 5 including porous spacing means positioned about said conductor within said volume defined by said enclosing means.

7. The cable splice assembly of claim 1 wherein said enclosing means comprises a bag containing said powder, and including a housing secured around said cable, said bag being attached at its open end to said housing enclosing said powder, said compressing means comprising a hood engaging a base housing compacting said powder.

8. A structure protecting a spliced conductor in a cable from moisture comprising:
   a. a first supporting means secured around said cable adjacent said spliced conductor;
   b. a second supporting means secured to said first supporting means and extending below said spliced conductor;
   c. an enclosing means secured to said first supporting means and positioned beneath said spliced conductor supported by said second supporting means, said enclosing means defining a volume in which said spliced conductor is disposed;
d. spacing means disposed within said volume of said enclosing means spacing apart said enclosing means and said spliced conductor;
e. hydrophobic powder disposed within said volume of said enclosing means surrounding said spliced conductor; and
f. an elongated strip wrapped around said enclosing means compressing said powder, whereby said spliced conductor is protected from moisture.

9. The structure of claim 8 including a protective cover disposed about said compressing means.

* * * * *

UNITED STATES PATENT OFFICE
CERTIFICATE OF CORRECTION

Patent No. 3,919,460    Dated November 11, 1975

Inventor(s) William R. Neail and Clifford A. Rahm

It is certified that error appears in the above-identified patent and that said Letters Patent are hereby corrected as shown below:

Column 1, Line 67: "means and power" should read
--means and powder--

Column 3, Line 28: "of the protective jacket" should read --of the outer protective jacket--

Column 8, Line 39: "tape 90 tightly continuously" should read --tape 90 tightly and continuously--

Signed and Sealed this ninth Day of March 1976

[SEAL]

Attest:

RUTH C. MASON
Attesting Officer

C. MARSHALL DANN
Commissioner of Patents and Trademarks